US 8,402,034 B2

(12) United States Patent
McCloskey et al.

(10) Patent No.: US 8,402,034 B2
(45) Date of Patent: *Mar. 19, 2013

(54) USING A DYNAMICALLY-GENERATED CONTENT-LEVEL NEWSWORTHINESS RATING TO PROVIDE CONTENT RECOMMENDATIONS

(75) Inventors: Daniel John McCloskey, Dublin (IE); Marcello Trovati, Dublin (IE); Carol Sue Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,058

(22) Filed: Mar. 2, 2012

(65) Prior Publication Data

US 2012/0330939 A1 Dec. 27, 2012

Related U.S. Application Data

(63) Continuation of application No. 13/166,286, filed on Jun. 22, 2011.

(51) Int. Cl.
*G06F 17/30* (2006.01)
(52) U.S. Cl. .......................... 707/748; 707/749; 707/750
(58) Field of Classification Search .................. 707/748, 707/749, 750
See application file for complete search history.

(56) References Cited

U.S. PATENT DOCUMENTS

| | | | |
|---|---|---|---|
| 6,088,692 A | 7/2000 | Driscoll | |
| 6,723,680 B2 * | 4/2004 | Chung et al. | 504/120 |
| 7,290,005 B2 | 10/2007 | Corston-Oliver et al. | |
| 7,627,588 B1 | 12/2009 | Mohan et al. | |
| 7,730,085 B2 | 6/2010 | Hassan et al. | |
| 7,940,174 B2 * | 5/2011 | Tuck | 340/539.13 |
| 8,144,007 B2 * | 3/2012 | Tuck et al. | 340/539.13 |
| 2003/0064894 A1 * | 4/2003 | Chung et al. | 504/120 |
| 2007/0038608 A1 | 2/2007 | Chen | |
| 2007/0282892 A1 | 12/2007 | Probst et al. | |
| 2008/0255884 A1 | 10/2008 | Carus et al. | |
| 2009/0177496 A1 * | 7/2009 | Tuck et al. | 705/3 |
| 2009/0192954 A1 | 7/2009 | Katukuri et al. | |
| 2009/0323516 A1 * | 12/2009 | Bhagwan et al. | 370/216 |
| 2010/0005081 A1 | 1/2010 | Bennett | |
| 2010/0145903 A1 * | 6/2010 | Tuck | 706/54 |
| 2010/0223275 A1 | 9/2010 | Foulger et al. | |
| 2011/0158128 A1 * | 6/2011 | Bejerano et al. | 370/256 |
| 2011/0178879 A1 * | 7/2011 | Tuck et al. | 705/14.73 |

FOREIGN PATENT DOCUMENTS

JP 3037763 A 2/1991

OTHER PUBLICATIONS

Namita Saha, "Parameterized Newsworthiness Ranking", Online Document, Nov. 4, 2010, 1 Page.

* cited by examiner

*Primary Examiner* — Baoquoc N To
(74) *Attorney, Agent, or Firm* — Patents on Demand P.A; Brian K. Buchheit; Scott M. Garrett (57) ABSTRACT

A method for providing content-level data artifact recommendations can begin with the creation of a semantic library from the textual content of data artifacts by a newsworthy content recommendation engine. A base newsworthiness rating can be calculated using global newsworthiness parameters and behavioral functions that model newsworthy influences for each relationship contained in the semantic library. A user-specific search network can be generated that represents user-entered criteria and/or user task-related criteria. Within the semantic library, potential newsworthy semantic networks can be identified. Newsworthy content from each identified potential newsworthy semantic network can be dynamically determined based upon the base newsworthiness rating and a predefined newsworthiness threshold. The newsworthy content from the identified potential newsworthy semantic network can be related to the user-specific search network at the common node, creating a newsworthy content recommendation graph. The newsworthy content recommendation graph can be presented within a user interface.

15 Claims, 6 Drawing Sheets

FIG. 6

USING A DYNAMICALLY-GENERATED CONTENT-LEVEL NEWSWORTHINESS RATING TO PROVIDE CONTENT RECOMMENDATIONS

CROSS-REFERENCE TO RELATED APPLICATIONS

This application is a continuation of U.S. patent application Ser. No. 13/166,286, filed Jun. 22, 2011 (pending), which is incorporated herein in its entirety.

BACKGROUND

The present invention relates to the field of data analysis.

The concept of providing a user with suggestions or recommendations related to an item they have viewed has become a common element of many types of data systems. For example, many retail Web sites analyze the history of products a shopper has viewed or purchased to recommend other related products that the shopper may be interested in purchasing. In a more traditional data system, recommendations for data files or documents related to a user's past viewing history or a set of search criteria are determined and presented to the user.

While this technique is often helpful, conventional recommendation engines are limited to basing their recommendations for the related products or documents, collectively referred to as data artifacts, at the artifact-level. That is, metadata about the data artifact, such as subject and author, are as the basis for providing recommendations for data artifacts related to the user's history or criteria. This results in the user having to read through each recommended data artifact in order to ascertain what content is newsworthy or of value to their current task, decreasing a user's certainty in the applicability of the recommendations.

BRIEF SUMMARY

One aspect of the present invention can include a method for providing content-level data artifact recommendations. Such a method can begin with the creation of a semantic library from the textual content of data artifacts by a newsworthy content recommendation engine using a predetermined semantic ontology. The textual content of each data artifact can be represented as a semantic network comprised of semantic units that express relationships between subject nodes and object nodes. Separate semantic networks can be inter-related at common nodes. A base newsworthiness rating can be calculated for each relationship contained in the semantic library. Calculation of the base newsworthiness rating can utilize global newsworthiness parameters and behavioral functions that model newsworthy influences between the nodes of the semantic networks. A user-specific search network can be generated that contains semantic units that reflect user-entered criteria and/or user task-related criteria. Within the semantic library, potential newsworthy semantic networks can be identified that have a common node with the user-specific search network. The existence of newsworthy content can be dynamically determined for each identified potential newsworthy semantic network with respect to the user-specific search network. Newsworthy content can be represented by semantic units from an identified potential newsworthy semantic network that are related via a series of common nodes and are traceable to the at least one node in common with the user-specific search network. This determination can be based upon the base newsworthiness rating of the semantic units and a predefined newsworthiness threshold. When newsworthy content exists, the newsworthy content from the identified potential newsworthy semantic network can be related to the user-specific search network at the common node, creating a newsworthy content recommendation graph. The newsworthy content recommendation graph can then be presented within a user interface.

Another aspect of the present invention can include a system for providing content-level data artifact recommendations. Such a system can include data sources, a user context, and a newsworthy content recommendation engine. The data sources can house data artifacts having textual content. The user context can represent user-entered criteria and/or user task-related criteria. The user task-related criterion can be captured from a user session. The newsworthy content recommendation engine can be configured to generate a newsworthy content recommendation graph for the user context. The newsworthy content recommendation engine can include a semantic library, one or more semantic ontologies, a semantic network generator, a semantic recommendation handler, behavioral functions, global newsworthiness parameters, a predefined newsworthiness threshold, and a newsworthiness calculator. The semantic library can represent the textual content of the data artifacts as semantic networks comprised of semantic units that express relationships between subject nodes and object nodes. Separate semantic networks can be inter-related at common nodes. The semantic ontologies can define the domains for describing the semantic networks. The semantic network generator can be configured to create the semantic library from the textual content of the data artifacts using the semantic ontologies. The semantic recommendation handler can be configured to identify semantic networks within the semantic library that are related to the user context. The behavioral functions can be configured to model the influences of the subject nodes upon the object nodes. The global newsworthiness parameters can define default values for variables utilized in the behavioral functions. The predefined newsworthiness threshold can define a minimum value for a semantic unit to be determined as newsworthy with respect to the user context. The newsworthiness calculator can be configured to calculate the newsworthiness rating for the semantic units contained in the semantic networks identified by the semantic recommendation handler with respect to the user context using the behavioral functions, the global newsworthiness parameters, and the predefined newsworthiness threshold. Semantic units determined to be newsworthy can be included in the newsworthy content recommendation graph.

Yet another aspect of the present invention can include a computer program product that includes a computer readable storage medium having embedded computer usable program code. The computer usable program code configured to create a semantic library from data artifacts having textual content using a predetermined semantic ontology. The textual content of each data artifact can be represented as a semantic network comprised of semantic units that express relationships between subject nodes and object nodes. Separate semantic networks can be inter-related at common nodes. The computer usable program code can also be configured to calculate a base newsworthiness rating for each relationship contained in the semantic library. The calculation of the base newsworthiness rating can utilize global newsworthiness parameters and behavioral functions that model newsworthy influences between nodes of the semantic network. The computer usable program code can be configured to generate a user-specific search network containing semantic units that reflect user-entered criteria and/or user task-related criteria. The computer usable program code can be further configured to identify, within the semantic library, potential newsworthy semantic networks that have a common node with the user-specific search network. The computer usable program code can be configured to dynamically determine the existence of newsworthy content in each identified potential newsworthy semantic network with respect to the user-specific search network. Newsworthy content can be represented by semantic units from an identified potential newsworthy semantic network that are related via a series of common nodes and are traceable to the at least one node in common with the user-specific search network. This determination can be based upon the base newsworthiness rating of the semantic units and a predefined newsworthiness threshold. When newsworthy content exists, the computer usable program code can be configured to relate the newsworthy content from the identified potential newsworthy semantic network to the user-specific search network at the common node, creating a newsworthy content recommendation graph. Then, the computer usable program code can be configured to present the newsworthy content recommendation graph within a user interface.

DETAILED DESCRIPTION

To improve user confidence in their recommendations, some recommendation engines focus on keyword searches, using the number of times that the keyword or phrase appears in the data artifact as a basis of a relevance rating. This type of statistical analysis, however, does not ensure the applicability of a data artifact to the user's task at hand, especially when the data artifact contains contents from a variety of sources like a mashup or active server page.

Alternately, some recommendation engines have attempted to use semantic networks to express the relationships between entities described in the data artifact. While semantic networks are a powerful tool to provide in-depth contextual information, the sheer size and quantity of the semantic networks are prohibitive in terms of computational and storage/maintenance requirements. These shortcomings are addressed in the disclosure.

That is, the disclosure provides a solution for making newsworthy recommendations at the content-level from a library of semantic networks. The concept of newsworthiness can be modeled by a newsworthy content recommendation engine using behavioral functions and parameters. A newsworthiness rating can be calculated for the contents of semantic networks that have a node in common with a set of recommendation criteria, which can be user-specific. Content whose newsworthiness rating satisfies a predefined newsworthiness threshold can then be included in a newsworthy content recommendation graph that is presented to the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
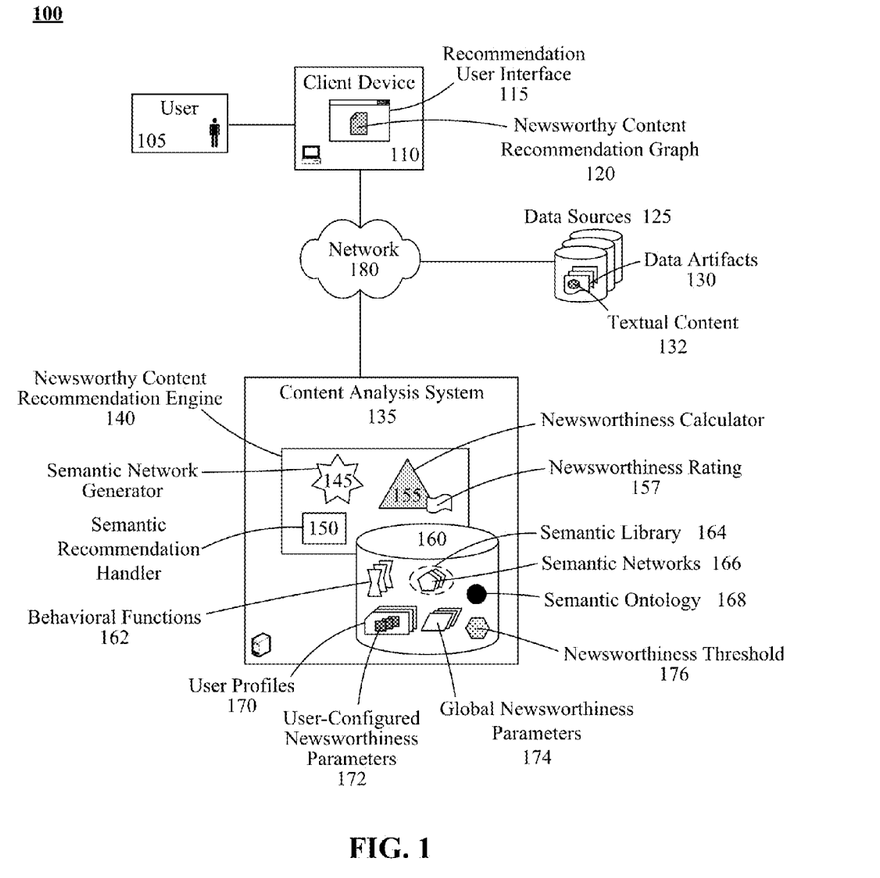
FIG. 1 is a schematic diagram illustrating a system that utilizes a newsworthy content recommendation engine to provide a user with content-level recommendations of data artifacts in accordance with embodiments of the inventive arrangements disclosed herein.

FIG. 1 is a schematic diagram illustrating a system 100 that utilizes a newsworthy content recommendation engine 140 to provide a user 105 with content-level recommendations of data artifacts 130 in accordance with embodiments of the inventive arrangements disclosed herein. In system 100, the newsworthy content recommendation engine 140 can present the user 105 with a newsworthy content recommendation graph 120 within a recommendation user interface 115.

The newsworthy content recommendation engine 140 can represent the hardware and/or software components necessary to utilize semantic network analysis upon data artifacts 130 to provide the user 105 with a newsworthy content recommendation graph 120. As shown in system 100, the newsworthy content recommendation engine 140 can be a component of a content analysis system 135. The content analysis system 135 can represent the hardware and/or software that comprise a computing system designed for data analysis and/or management functions.

For example, the content analysis system 135 can be a content management system and the newsworthy content recommendation engine 140 can be a component of the content management system that recommends to the user 105 other data artifacts 130 having newsworthy content.

In another contemplated embodiment, the newsworthy content recommendation engine 140 can exist separate and remote from the content analysis system 135, such as in a service-oriented architecture (SOA) environment where the functions of the newsworthy content recommendation engine 140 are provided as a service to various requestors (e.g., content analysis systems 135 and Web sites).

The content analysis system 135 and/or newsworthy content recommendation engine 140 can obtain data artifacts 130 from a variety of data sources 125. As used herein, the term "data artifact 130" is used to refer to a discrete electronic container of data like a spreadsheet file or a Web page.

A data source 125 can represent the originating storage point and/or provider of the data artifacts 130. Examples of data sources 125 can include, but are not limited to, internal/external Web sites, public and/or private databases, electronic file servers, social networking sites, Web feeds, online collaboration systems, and the like.

Depending upon the type of data source 125, the newsworthy content recommendation engine 140 can require additional configuration (i.e., account name and password) to obtain access to the data artifacts 130, which can be stored in a configuration file (not shown).

The newsworthy content recommendation engine 140 can include components such as a semantic network generator 145, a semantic recommendation handler 150, a newsworthiness calculator 155, and a data store 160 to house a variety of supporting operational data. The semantic network generator 145 can represent a software component of the newsworthy content recommendation engine 140 configured to handle functions related to the creation of semantic networks 166.

As understood in the art, and, as used herein, the term "semantic network 166" can be used to refer to a knowledge representation that expresses relationships between concepts, typically called a subject node and an object node. For example, in a semantic network 166, the sentence, "A fish lives in water", can be expressed as a semantic unit that contains the subject node, "fish", the relationship, "lives in", and the object node, "water".

Further, the semantic networks 166 discussed herein can be characterized as being "multi-graph" or capable of having more than one relationship between nodes. That is, the relationship from Node A to Node B can be different than the relationship from Node B to Node A and/or Node A can have multiple types of relationships to Node B.

The elements (i.e., terminology for nodes and relationships, dependencies, and inheritances) used in a semantic network 166 can be defined in a corresponding semantic ontology 168. Since a semantic ontology 168 can define a specific domain or subject, the newsworthy content recommendation engine 140 can require multiple semantic ontologies 168 to handle data artifacts 130 of varying subject matter.

To create the semantic networks 166, the semantic network generator 145 can be configured to utilize natural language processing (NLP) techniques. In one embodiment, limitations can be applied to news content to make NLP processing easier. For example, in one embodiment, the type of data artifacts 130 utilized by the newsworthy content recommendation engine 140 can be limited to those data artifacts 130 having textual content 132. In another embodiment, optical character recognition (OCR) techniques can be used to convert graphically embedded content (e.g., images and video) into text, which can be processed by engine 140. In one embodiment of the disclosure, semantic network 166 components derived from structured or explicit data (e.g., information contained in a table in a relational database, and the like) can also be utilized to create semantic networks 166.

It should also be noted that as the accuracy of optical character recognition (OCR) improves, this embodiment of the present disclosure can be expanded upon to handle data artifacts 130 that contain textual content 132 in an image (e.g., portable network graphics (PNG) format) or stream-based format (e.g., portable document format (PDF)) without departing from the spirit of the present disclosure.

Should the data artifact 130 encapsulate its textual content 132 within a predefined format structure, such as the tag structure common to the hypertext and extensible markup languages (HTML and XML), the semantic network generator 145 can be configured to also include pre-processing components to remove the formatting elements.

Additionally, the semantic network generator 145 can be configured to inter-relate semantic networks 166 at common nodes. This can result in the semantic library 164 appearing like one or more large semantic networks 166 instead of a multitude of individual, unrelated semantic networks 166.

The inter-relation of semantic networks 166 that share common nodes can be helpful when determining recommendations of newsworthy content (i.e., all relationships of the common node can be considered as having the potential to provide newsworthy content). Further, the inter-relationships can identify content that may have been previously considered unrelated at higher levels.

Thus, the semantic network generator 145 can be used to create a semantic library 164 of inter-related semantic networks 166 that represent the textual content 132 of the data artifacts 130. Further, changes made to the textual content 132 of a data artifact 130 can trigger the semantic network generator 145 to also adjust the semantic network 166 corresponding to the data artifact 130, keeping the contents of the semantic library 164 "in-sync" with the supporting data artifacts 130.

The semantic network generator 145 can also be used to generate the basis of the newsworthy content recommendation graph 120 referred to as the user-specific search network (not shown) that will be discussed in later Figures. In essence, semantic network generator 145 can analyze information that was either manually entered by the user 105 and/or captured by the newsworthy content recommendation engine 140 and create a semantic network 166 that represents the specific context of the user 105 that can be used by the semantic recommendation handler 150 as the basis for recommendations.

The semantic recommendation handler 150 can represent the component of the newsworthy content recommendation engine 140 that determines what content from the semantic library 164 is newsworthy, and, therefore, should be included in the newsworthy content recommendation graph 120 presented to the user 105. The semantic recommendation handler 150 can be configured to use keyword search functions as well as semantics when identifying content that has the potential to be newsworthy to the user 105.

The semantic recommendation handler 150 can also utilize the newsworthiness rating 157 calculated by the newsworthiness calculator 155 and the predefined newsworthiness threshold 176 when determining the newsworthiness of the content from the semantic library 164. The predefined newsworthiness threshold 176 can represent a minimum value that the newsworthiness rating 157 must meet in order to be included in the newsworthy content recommendation graph 120. The newsworthiness rating 157 can represent the quantification of the newsworthiness of one or more semantic units (i.e., a single relationship or a series of relationships).

The newsworthiness calculator 155 can represent the component of the newsworthy content recommendation engine 140 that calculates a newsworthiness rating 157 for the semantic units of the semantic library 164. Calculation of the newsworthiness rating 157 by the newsworthiness calculator 155 can utilize the behavioral functions 162, global newsworthiness parameters 174, and/or user-configured newsworthiness parameters 172 in data store 160.

The behavioral functions 162 can be mathematical expressions that model the different types of influences between the nodes of the semantic networks 166 associated with the overall concept of newsworthiness as well as the behaviors of the influences. Examples of influences/behaviors can include, but are not limited to, the type of relationship, the propagation of the influence, entropy, temporal constraints, proximity, unusualness, human interest, prominence, scale, consequence, and the like.

For example, information about Airline A having a plane crash can be considered more newsworthy if it occurred recently (temporal constraint), has occurred often for Airline A (scale), or involved a large quantity of casualties (consequence).

The global newsworthiness parameters 174 can represent a variety of system-level variables for use by the newsworthiness calculator 155 and/or newsworthy content recommendation engine 140, such as default values for the variables expressed in the behavioral functions 162 or weighting values assigned to data sources 125 to express reliability or priority.

Since the concept of newsworthiness can be subjective, a set of user-configured newsworthiness parameters 172 can be used to allow the user 105 to adjust how the newsworthiness of content is determined. The user-configured newsworthiness parameters 172 can represent an override value to the corresponding default global newsworthiness parameters 174 or newsworthiness threshold 176 and/or can implement a separate means for adjusting the newsworthiness rating 157 (i.e., a newsworthiness questionnaire).

For example, the global newsworthiness parameters 174 can express that content from the data source 125, "TIME", is more newsworthy than content from the data source 125, "CNN". However, a user 105 can use the user-configured newsworthiness parameters 172 to indicate that content from the data source 125, "FOXNEWS", is more newsworthy than "TIME".

To improve performance, the newsworthiness calculator 155 can pre-calculate newsworthiness ratings 157, on the whole or in part, for the entirety of the semantic library 164 using only the global newsworthiness parameters 174 (i.e., a base newsworthiness rating 157), since many of the influences of newsworthiness do not vary significantly over time. Then, when a newsworthy content recommendation graph 120 needs to be generated, those calculations affected by user-configured newsworthiness parameters 172 and/or time-sensitive parameters can then be completed or adjusted dynamically to produce a final or user-specific newsworthiness rating 157.

Further, a pre-calculated or base newsworthiness rating 157 can be used as a gauge as to whether the semantic network 166 or a branch of the semantic network 166 has the potential to be newsworthy to the user 105. That is, portions of a semantic network 166 that have a relatively low base newsworthiness rating 157, and, are, therefore, less likely to meet the newsworthiness threshold 176 overall, can be removed prior to applying the user-configured newsworthiness parameters 172.

Such a technique can help to mitigate the issue of the expansive computational load that is often common to searching through a large body of semantic networks 166. Thus, the expenditure of resources by the newsworthy content recommendation engine 140 can be focused prior to any further in-depth processing of the semantic networks 166, increasing the overall performance of the newsworthy content recommendation engine 140.

The user-configured newsworthiness parameters 172 can be associated with the specific user 105, such as in a user profile 170. The user profile 170 can also be used to store other personal data about the user 105, such as address, birth date, and ethnicity, which can also be used by the semantic recommendation handler 150 and/or semantic network generator 145.

Once the newsworthy content is determined, the newsworthy content recommendation engine 140 can create the newsworthy content recommendation graph 120. The newsworthy content recommendation graph 120 can be a semantic network that visually expresses the determined newsworthy content from the semantic library 164 and/or the underlying search criteria.

It is important to emphasize that the recommendations contained in the newsworthy content recommendation graph 120 can be the actual content of a data artifact 130 and not just a reference to the corresponding data artifact 130. It should be noted that the actual content of a data artifact 130 can, in fact, be as little as a concept node. For example, in one embodiment the actual content can be a condensed representation of the semantic unit itself as it was mined from the content in the creation of the semantic networks 166. This technique can, therefore, provide the user 105 with recommendations having a level of relevance (i.e., data-level versus document-level) that conventional recommendation engines lack.

The newsworthy content recommendation graph 120 can presented to the user 105 in the recommendation user interface 115. The recommendation user interface 115 can represent a graphical user interface running on a client device 110 that allows the user 105 to interact with the newsworthy content recommendation engine 140. The recommendation user interface 115 can be implemented in a variety of ways, dependent upon the requirements and technology utilized by the newsworthy content recommendation engine 140, content analysis system 135, and/or underlying support components.

In one embodiment the recommendation user interface 115 can be an incorporated element of a user interface (not shown) used by the content analysis system 135 (i.e., a widget).

The client device 110 can represent a variety of computing devices capable of supporting the operation of the recommendation user interface 115 and communicating with the newsworthy content recommendation engine 140 and/or content analysis system 135 over a network 180.

In addition to viewing the newsworthy content recommendation graph 120, the recommendation user interface 115 can be configured to allow the user 105 to perform a variety of activities, such as navigating through the nodes of the newsworthy content recommendation graph 120, accessing the data artifact 130 corresponding to a node, modifying the user-configured newsworthiness parameters 172, and/or exploring the impact of the various newsworthiness factors upon the content contained in the newsworthy content recommendation graph 120.

For example, a user 105 may view the newsworthy content recommendation graph 120 and feel that specific semantic unit should not have been included. In order to prevent the inclusion of this semantic unit in the future, the user 105 can select the option to adjust newsworthiness factors (i.e., enter an "Explore" mode).

The user 105 can then be presented with pertinent information about the specific semantic unit like applicable global 174 and/or user-configured newsworthiness parameters 172.

As the user 105 modifies values of the presented information, a second newsworthy content recommendation graph 120 can be dynamically generated and displayed to illustrate the impact of the changes (without affecting the operation of the newsworthy content recommendation engine 140 as a whole). This can provide the user 105 with in-depth knowledge about the behavior of newsworthiness modeled by the newsworthy content recommendation engine 140.

Network 180 can include any hardware/software/and firmware necessary to convey data encoded within carrier waves. Data can be contained within analog or digital signals and conveyed though data or voice channels. Network 180 can include local components and data pathways necessary for communications to be exchanged among computing device components and between integrated device components and peripheral devices. Network 180 can also include network equipment, such as routers, data lines, hubs, and intermediary servers which together form a data network, such as the Internet. Network 180 can also include circuit-based communication components and mobile communication components, such as telephony switches, modems, cellular communication towers, and the like. Network 180 can include line based and/or wireless communication pathways.

As used herein, presented data store 160 and data sources 125 can be a physical or virtual storage space configured to store digital information. Data store 160 and/or data sources 125 can be physically implemented within any type of hardware including, but not limited to, a magnetic disk, an optical disk, a semiconductor memory, a digitally encoded plastic memory, a holographic memory, or any other recording medium. Data store 160 and/or data sources 125 can be a stand-alone storage unit as well as a storage unit formed from a plurality of physical devices. Additionally, information can be stored within data store 160 and/or data sources 125 in a variety of manners. For example, information can be stored within a database structure or can be stored within one or more files of a file storage system, where each file may or may not be indexed for information searching purposes. Further, data store 160 and/or data sources 125 can utilize one or more encryption mechanisms to protect stored information from unauthorized access.

Figure 2:
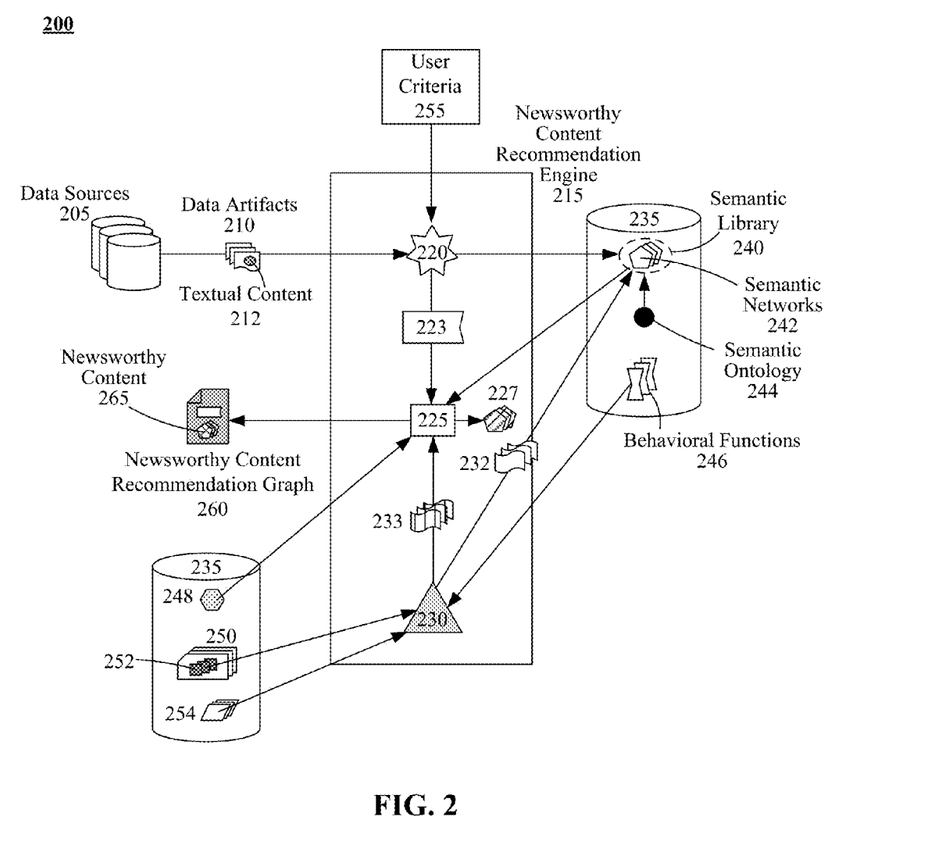
FIG. 2 is an illustrated process flow detailing the generation of a newsworthy content recommendation graph by a newsworthy content recommendation engine in accordance with an embodiment of the inventive arrangements disclosed herein.

FIG. 2 is an illustrated process flow 200 detailing the generation of a newsworthy content recommendation graph 260 by a newsworthy content recommendation engine 215 in accordance with embodiments of the inventive arrangements disclosed herein. Process flow 200 can be performed within the context of system 100.

Process flow 200 can begin with the receipt or acquisition of data artifacts 210 from data sources 205 by the newsworthy content recommendation engine 215. Using the appropriate semantic ontology 244, the semantic network generator 220 can process the textual content 212 of the data artifacts 210 into corresponding semantic networks 242. The generated semantic networks 242 can be collectively referred to as the semantic library 240.

The semantic ontology 244 and the semantic library 240 can be stored in a data store 235 accessible by the newsworthy content recommendation engine 215. At this time (i.e., creation and/or modification to a semantic network 242), the newsworthiness calculator 230 can determine a pre-calculated or base newsworthiness rating 232 for the contents of the semantic library 240 using the behavioral functions 246 and global newsworthiness parameters 254. The base newsworthiness rating 232 can be stored in association with the corresponding semantic units in the semantic library 240 for later use.

It should be noted that data store 235 and its stored components have been split into two distinct entities in process flow 200 for the sake of clarity and is not meant to imply a need for data segregation within data store 235.

Additional activity on the part of the newsworthy content recommendation engine 215 can occur when the need to generate a newsworthy content recommendation graph 260 arises. Whether triggered manually by a user or automatically by another data system, the newsworthy content recommendation engine 215 can obtain user criteria 255 to act as the foundation of its recommendations.

The user criteria 255 can be represented by specific terms explicitly provided by the user (i.e., a search form) and/or data extracted by the newsworthy content recommendation engine 215 from an analysis of the user's current computing session. The type of user criteria 255 received can depend upon the specific implementation of the newsworthy content recommendation engine 215.

For example, it can be easier to access information about a user's session in an enterprise computing environment (i.e., intranet) than from a user's personal computer over the Internet. Thus, it more likely for session information to be captured and used as user criteria 255 when the newsworthy content recommendation engine 215 operates in a closed system with the user. However, it should be noted that the disclosure is not intended to be limited to a closed system. In fact, in an open system, a client module (e.g., but not limited to, a web browser plug-in) can capture session information to be used as user criteria 255 by the newsworthy content recommendation engine 215.

From the user criteria 255, the semantic network generator 220 can create a user-specific search network 223. The user-specific search network 223 can be a semantic network representation of the user criteria 255 that can be used for searching the semantic library 240 and/or as the basis of the newsworthy content recommendation graph 260 (i.e., newsworthy content 265 can be related to nodes contained in the user-specific search network 223).

The semantic recommendation handler 225 can use the user-specific search network 223 to determine a set of potentially newsworthy content 227 from the semantic networks 242 of the semantic library 240. Items of potentially newsworthy content 227 will often have at least a node in common with the user-specific search network 223. It should be understood, however, that the disclosure is not limited in this regard. For example, situations are contemplated where the returned newsworthy graph doesn't include anything from the search network. In other words, the nature of scope propagation, network topology and thresholds can result in situations where content returned is not common with what was queried. These situations are contemplated within the scope of the disclosure.

The semantic recommendation handler 225 can utilize the base newsworthiness rating 232, behavioral functions 246, global newsworthiness parameters 254, and user-configured newsworthiness parameters 252 stored in a user profile 250, when available, to calculate a final newsworthiness rating 233 for the potentially newsworthy content 227. Potentially newsworthy content 227 whose final newsworthiness rating 233, which can equate to the base newsworthiness rating 232 in the absence of user-configured newsworthiness parameters 252, satisfies the predefined newsworthiness threshold 248 can be included in the newsworthy content recommendation graph 260 as newsworthy content 265.

As used herein, presented data store 235 and data sources 205 can be a physical or virtual storage space configured to store digital information. Data store 235 and/or data sources 205 can be physically implemented within any type of hardware including, but not limited to, a magnetic disk, an optical disk, a semiconductor memory, a digitally encoded plastic memory, a holographic memory, or any other recording medium. Data store 235 and/or data sources 205 can be a stand-alone storage unit as well as a storage unit formed from a plurality of physical devices. Additionally, information can be stored within data store 235 and/or data sources 205 in a variety of manners. For example, information can be stored within a database structure or can be stored within one or more files of a file storage system, where each file may or may not be indexed for information searching purposes. Further, data store 235 and/or data sources 205 can utilize one or more encryption mechanisms to protect stored information from unauthorized access.

Figure 3:
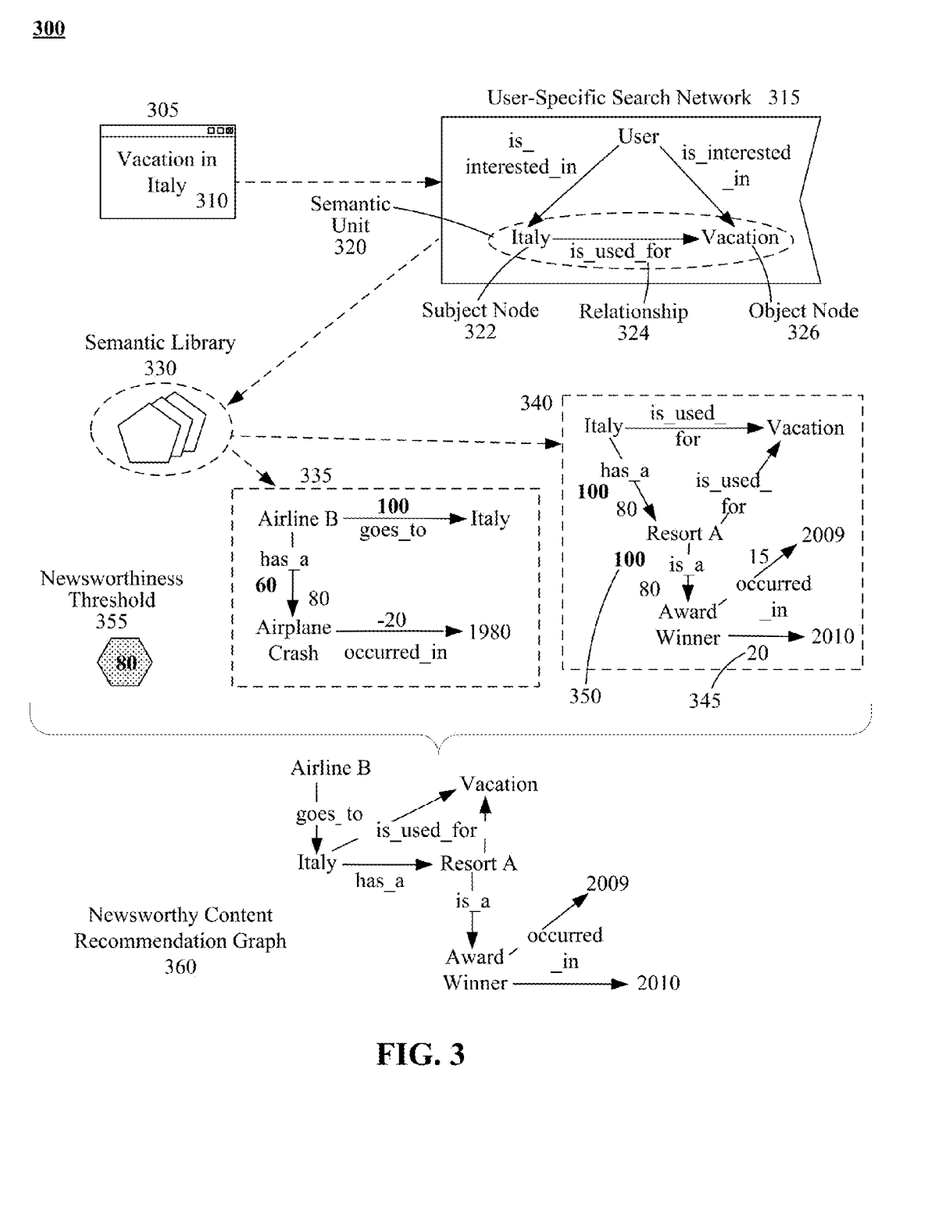
FIG. 3 is an illustrated example depicting the generation of a newsworthy content recommendation graph in accordance with an embodiment of the inventive arrangements disclosed herein.

FIG. 3 is an illustrated example 300 depicting the generation of a newsworthy content recommendation graph 360 in accordance with embodiments of the inventive arrangements disclosed herein. Illustrated 300 can be performed in the context of system 100 and/or represent a specific embodiment of process flow 200.

It is important to note that illustrated example 300 can represent a simplified, visual description of the generation process for a newsworthy content recommendation graph 360. As such, the contents of illustrated example 300 are not to be interpreted as absolute implementation or limitation to any embodiment of the present disclosure.

In illustrated example 300, let us assume that the newsworthy content recommendation engine has been configured to provide a newsworthy content recommendation graph 360 as a user browses the Internet. A user then views a Web page 310 about vacationing in Italy in a Web browser 305. Thus, the newsworthy content recommendation engine would set about providing the user with a newsworthy content recommendation graph 360 about vacationing in Italy.

As discussed previously, a user-specific search network 315 can be created to express what the recommendations should be related—vacationing in Italy. Using a semantic ontology, the text, vacationing in Italy, can be processed into the user-specific search network 315 shown in illustrated example 300.

The user-specific search network 315 shown here can include three semantic units 320, each containing a subject node 322 with a relationship 324 to an object node 326. It is important to note that an object node 326 can be the subject node 322 of a subsequent semantic unit 320 (i.e., a series of relationships).

Next, the newsworthy content recommendation engine can search through the semantic library 330 to find semantic networks 335 and 340 that have the potential to be newsworthy for the user-specific search network 315.

Semantic network 335 can be about Airline B that has flights to Italy and experienced a plane crash in 1980. Semantic network 340 can contain information about Resort A that is in Italy and was an award winner in 2009 and 2010. Both semantic networks 335 and 340 have the node, Italy, in common with the user-specific search network 315, and semantic network 340 also shared the node, vacation.

In each semantic network 335 and 340, values can be seen by the relationships 324. The non-bold-face values can represent the base newsworthiness rating 345, while the bold-face values can represent the final newsworthiness rating 350 of the semantic unit 320 or a collective of semantic units 320, in the case where semantic units 320 have a dependency and are to be assessed together. A single bold-faced value can represent both the base and final newsworthiness ratings 350 of the relationship 324 (i.e., the final newsworthiness rating 350 is equal to the base newsworthiness rating 345).

The contents of each semantic network 335 and 340 can then examined for newsworthiness with respect to a newsworthiness threshold 355 of 80. Starting with semantic network 335, the semantic unit 320 expressing that Airline B goes to Italy has a final newsworthiness rating 350 of 100, and, therefore, should be included in the newsworthy content recommendation graph 360.

The semantic unit 320 stating that Airline B had an airplane crash has a final newsworthiness rating 350 of 60, meaning it is not considered to be newsworthy. This semantic unit 320 can, however, illustrate an important point about dependencies and the calculation of final newsworthiness ratings 350.

As shown in illustrated example 300, this semantic unit 320 (Airline B has an airplane crash) can have a base newsworthiness rating 345 of 80, indicating that it definitely has the potential to be newsworthy. So, this semantic unit 320 would remain when pre-processing the content of semantic network 335 to remove elements having a base newsworthiness rating 345 that is less than the newsworthiness threshold 355 by a value of at least 30.

The following semantic unit 320 (airplane crash occurred in 1980) can have a base newsworthiness rating 345 of −20 to represent that the newsworthiness of this piece of data has decreased over time. The "occurred_in" relationship 324 can be defined in the semantic ontology as having a dependency to its previous semantic unit 320. That is, the newsworthiness of a semantic unit 320 having an "occurred_in" relationship 324 cannot be independently assessed.

Therefore, the base newsworthiness ratings 345 of both semantic units 320 can be combined according to a set equation, simple addition in this example 300. Since the resultant final newsworthiness rating 350 of 60, which is applicable to both semantic units 320 as a single unit, is less than the newsworthiness threshold 355, these semantic units 320 can be omitted from the newsworthy content recommendation graph 360.

This same type of approach can also be applied to semantic network 340, where all of the semantic units 320 can be determined as newsworthy, as well as any other relevant semantic networks from the semantic library 330.

As shown in illustrated example 300, the resultant newsworthy content recommendation graph 360 can contain the union of the user-specific search network 315, minus the user portion for readability, and the newsworthy content from semantic networks 335 and 340.

Figure 4:
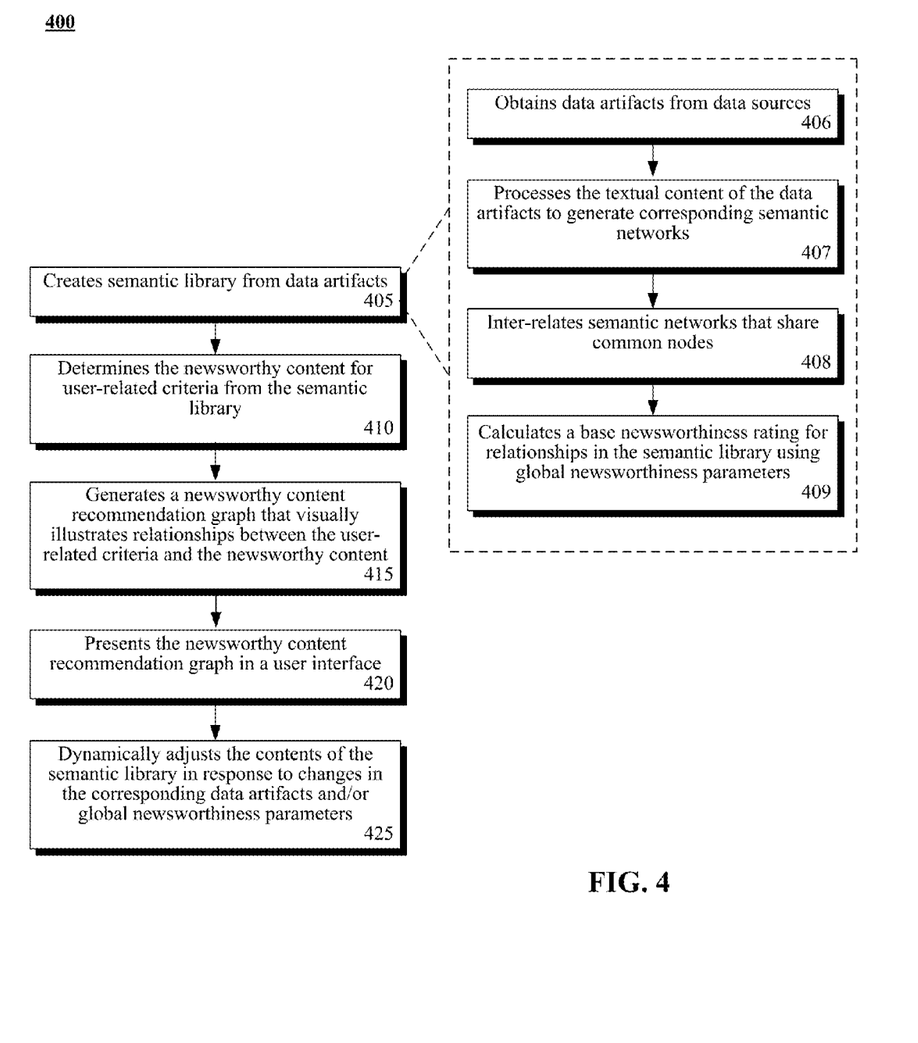
FIG. 4 is a flow chart of a method describing the basic operation of a newsworthy content recommendation engine in accordance with embodiments of the inventive arrangements disclosed herein.

FIG. 4 is a flow chart of a method 400 describing the basic operation of a newsworthy content recommendation engine in accordance with embodiments of the inventive arrangements disclosed herein. Method 400 can be performed within the context of system 100 and/or process flow 200.

Method 400 can begin in step 405 where the newsworthy content recommendation engine can create the data artifacts. Sub-steps 406-409 can describe, in more detail, the tasks performed to execute step 405.

The data artifacts can be obtained from their data sources in sub-step 406. Depending upon the data source, sub-step 406 can involve actions like the use of subscription services or scripted batch downloads. In sub-step 407, the textual content of the data artifacts can be processed to generate corresponding semantic networks.

The semantic networks can then be inter-related at common nodes in sub-step 408. In sub-step 409, a base newsworthiness rating can be calculated for the relationships contained in the semantic library using the global newsworthiness parameters.

Once the semantic library is created, step 410 can execute where newsworthy content for user-related criteria can be determined from the semantic library. The newsworthy content recommendation graph that visually illustrates the relationships between the user-related criteria and the newsworthy content can be generated in step 415.

In step 420, the newsworthy content recommendation graph can be presented to the user in a user interface. The contents of the semantic library can be dynamically adjusted in response to changes in the corresponding data artifacts and/or global newsworthiness parameters in step 425.

Figure 5:
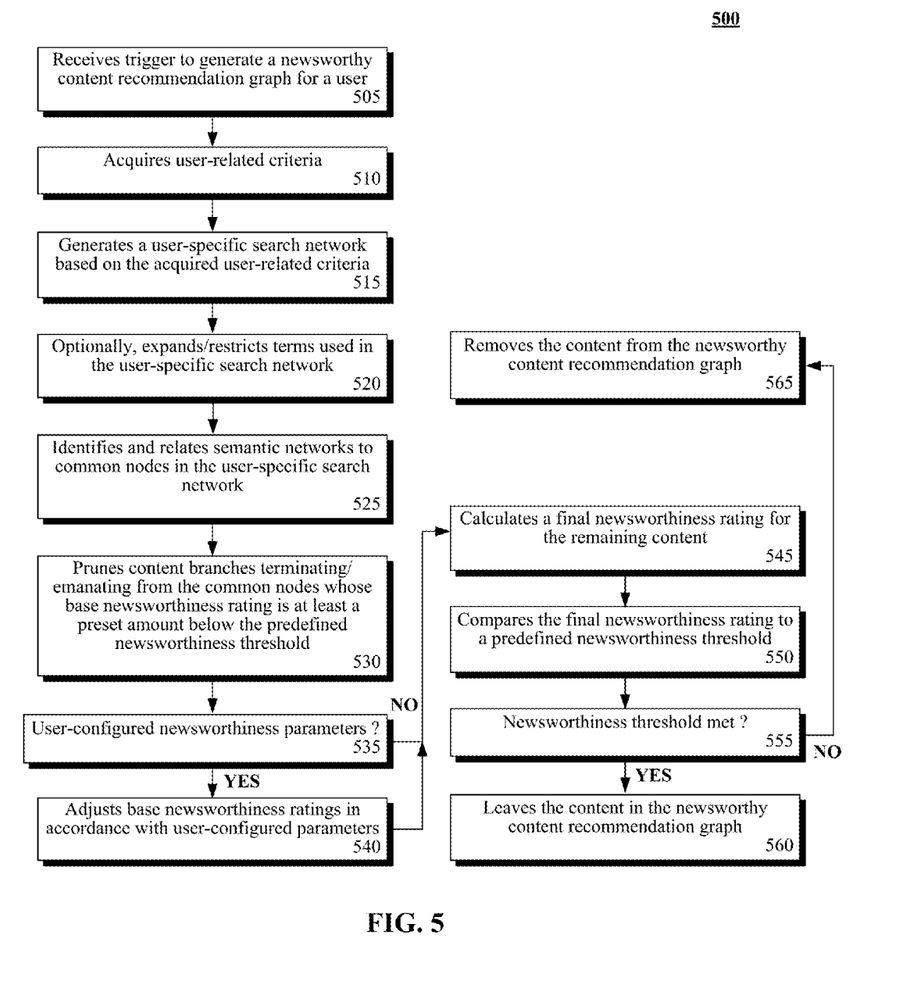
FIG. 5 is a flow chart of a method detailing the generation of a newsworthy content recommendation graph in accordance with embodiments of the inventive arrangements disclosed herein.

FIG. 5 is a flow chart of a method 500 detailing the generation of a newsworthy content recommendation graph in accordance with embodiments of the inventive arrangements disclosed herein. Method 500 can be performed within the context of system 100, process flow 200, and/or in conjunction with method 400.

Method 500 can begin in step 505 where the newsworthy content recommendation engine can receive a trigger to generate a newsworthy content recommendation graph for a user. This trigger can be explicitly initiated by the user (i.e., selecting a button), implicitly initiated by the user (i.e., Web browsing selections) or automatically initiated by another computing system.

User-related criteria can be acquired in step 510. The user-related criteria of step 510 can correspond to the user criteria 255 of process flow 200. In step 515, a user-specific search network can be generated based on the acquired user-related criteria.

Optionally, in step 520, the terms used in the user-specific search network can be expanded/restricted, which can be helpful when the semantic library contains semantic networks built with different semantic ontologies. For example, the newsworthy content recommendation engine can allow the use of synonymous terms for node names to increase commonalities.

Semantic networks having a node in common with the user-specific search network can then be identified and related to the user-specific search network at the common nodes in step 525. In step 530, content branches that terminate or emanate from the common nodes can be pruned if the base newsworthiness rating of the content branch is at least a preset amount below the predefined newsworthiness threshold.

It can be determined, in step 535, if the user has any stored user-configured newsworthiness parameters. When user-configured newsworthiness parameters exist, the base newsworthiness rating can be adjusted in accordance with the user-configured newsworthiness parameters in step 540.

Upon completion of step 540 or when user-configured newsworthiness parameters do not exist, flow of method 500 can proceed to step 545 where the final newsworthiness rating can be calculated for the remaining content. The final newsworthiness rating can then be compared to the predefined newsworthiness threshold in step 550.

In step 555, it can be determined if the final newsworthiness rating meets the newsworthiness threshold. When the newsworthiness threshold has been met, the content can be left in the newsworthy content recommendation graph in step 560. When the newsworthiness threshold has not been met, step 565 can execute where the content can be removed from the newsworthy content recommendation graph.

Figure 6:
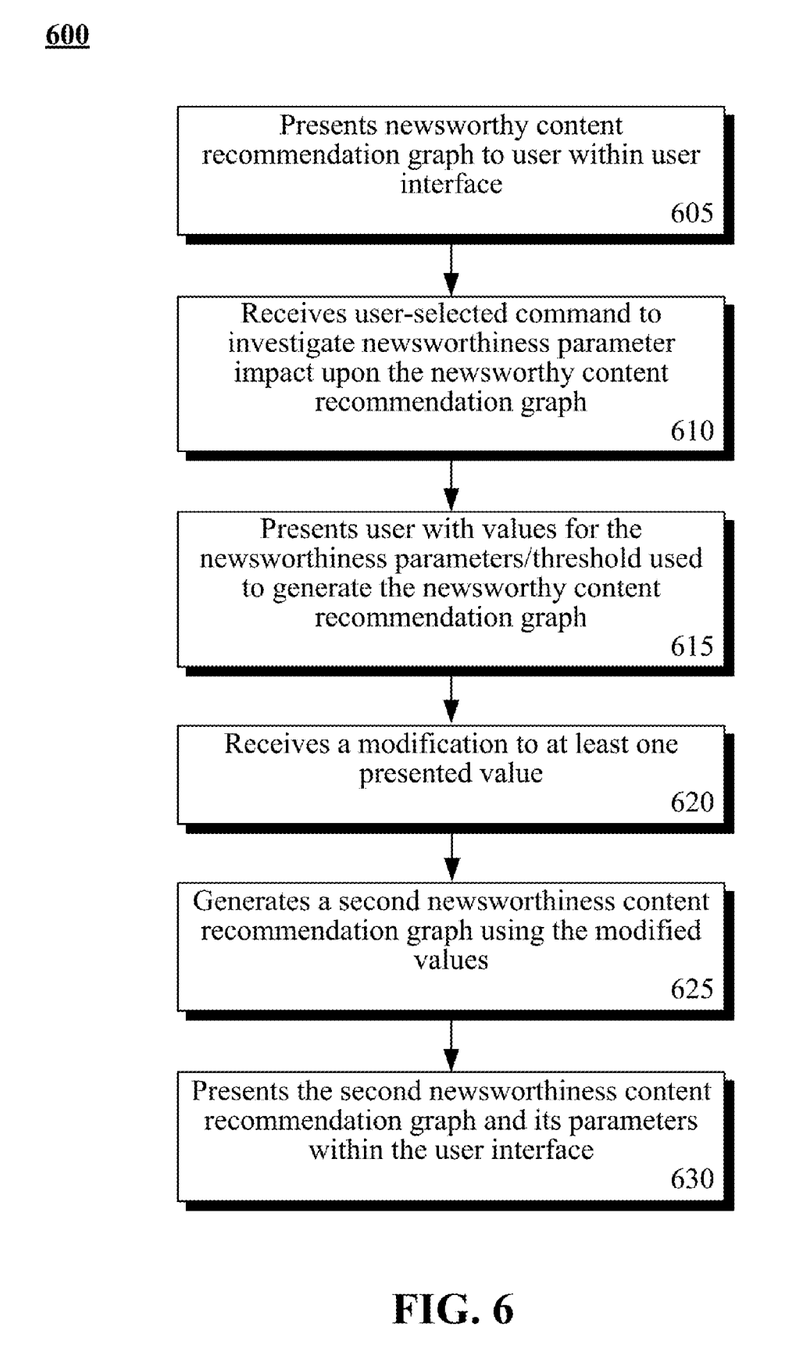
FIG. 6 is a flow chart of a method describing the use of the newsworthy content recommendation engine to explore the affect of newsworthiness parameters in accordance with embodiments of the inventive arrangements disclosed herein.

FIG. 6 is a flow chart of a method 600 describing the use of the newsworthy content recommendation engine to explore the affect of newsworthiness parameters in accordance with embodiments of the inventive arrangements disclosed herein.

Method 600 can be performed within the context of system 100, and/or in conjunction with process flow 200, methods 400 and/or 500.

Method 600 can begin in step 605 where the newsworthy content recommendation engine can present the newsworthy content recommendation graph to the user within the user interface. A user-selected command to investigate the impact of newsworthiness parameters upon the newsworthy content recommendation graph can be received in step 610.

In step 615, the user can be presented with values for the newsworthiness parameters, global and/or user-configured, and/or newsworthiness threshold that were used to generate the newsworthy content recommendation graph. Then, a modification to at least one of the presented values can be received in step 620. Value changes made by the user at this time can be stored separate from the actual values to ensure data integrity and operation of the newsworthy content recommendation engine.

In step 625, a second newsworthy content recommendation graph can be generated that uses the modified values. The second newsworthy content recommendation graph and its parameters can then be presented within the user interface in step 630.

The user can then visually compare the two newsworthy content recommendation graphs and continue to modify the parameter values to see how the contents of the second newsworthy content recommendation graph change. When the user is finished, they can be given the option to save their modifications as user-configured newsworthiness parameters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   creating a semantic library from textual content of data artifacts by a newsworthy content recommendation engine;
   calculating a base newsworthiness rating using at least one global newsworthiness parameter and at least one behavioral function that model at least one newsworthy influence for each relationship contained in the semantic library;
   generating a user-specific search network that represents user-entered criteria and/or user task-related criteria, wherein within the semantic library, at least one potential newsworthy semantic network is identified;
   dynamically determining newsworthy content from each identified potential newsworthy semantic network based upon the base newsworthiness rating and a predefined newsworthiness threshold, wherein the newsworthy content from the identified potential newsworthy semantic network is related to the user-specific search network at a common node; and
   creating a newsworthy content recommendation graph using the determined newsworthy content.

2. The method of claim 1, further comprising:
   presenting the newsworthy content recommendation graph within a user interface.

3. The method of claim 1, wherein the creating of the semantic library uses a predetermined semantic ontology, wherein the textual content of each of the data artifacts is represented as a semantic network comprised of a plurality of semantic units that express a relationship between a subject node and an object node, wherein separate semantic networks are inter-related at common nodes.

4. The method of claim 1, further comprising:
   detecting a change to the textual content of one of the data artifacts represented in the semantic library;
   modifying the semantic network corresponding to the one of the data artifacts to reflect the detected change;
   updating relationships of the modified semantic network to other semantic networks in the semantic library, wherein said updating results in at least one of a creation of new relationship to a node of another semantic network that is now common and a removal of an existing relationship to a node of another semantic network that is no longer common; and
   adjusting the base newsworthiness rating for the updated relationships.

5. The method of claim 2, further comprising:
   in response to user-selected commands within the user interface, changing a presentation of the newsworthy content recommendation graph to reflect user-navigation through related newsworthy content of the newsworthy content recommendation graph.

6. The method of claim 2, further comprising:
   in response to a user-selected command within the user interface, presenting a current value for the at least one global newsworthiness parameter used when determining the base newsworthiness rating for a selected relationship in the newsworthy content recommendation graph and the predefined newsworthiness threshold;
   receiving via the user interface a modification to the current value for the at least one global newsworthiness parameter and a value of the predefined newsworthiness threshold;
   creating a second newsworthy content recommendation graph using the user-specific search network, the received modification, and unmodified value for the at least one global newsworthiness parameter; and
   presenting the second newsworthy content recommendation graph within the user interface such that both the newsworthy content recommendation graph and the second newsworthy content recommendation graph are capable of being visually compared with each other.

7. The method of claim 2, wherein presenting of the newsworthy content recommendation graph further comprises:
   in response to a user-selected command within the user interface, providing at access to or source data about one of the data artifacts that corresponds to a selected node of the newsworthy content recommendation graph.

8. The method of claim 1, wherein the determining the existence of newsworthy content further comprises:
   based upon a dependency inherent in a relationship type of a semantic unit within the at least one identified potential newsworthy semantic network, computing a composite newsworthiness rating that represents the semantic unit and subordinate semantic units, wherein the composite newsworthiness rating utilizes the base newsworthiness rating of the semantic unit and the subordinate semantic units in conjunction with a predetermined mathematical expression.

9. The method of claim 1, wherein determining the existence of newsworthy content further comprises:
identifying an existence of at least one user-configured newsworthiness parameter for at least one global newsworthiness parameter; and
when at least one user-configured newsworthiness parameter exists, dynamically adjusting the calculation of the base newsworthiness rating for the newsworthy content of the identified semantic network with respect to the at least one user-configured newsworthiness parameter, wherein a value for a user-configured newsworthiness parameter takes precedence over a corresponding global newsworthiness parameter, wherein said adjusted newsworthiness rating is subsequently utilized in place of the base newsworthiness rating.

10. The method of claim 1, wherein determining the existence of newsworthy content further comprises:
comparing the base newsworthiness rating of the newsworthy content to the predefined newsworthiness threshold; and
when the base newsworthiness rating of the newsworthy content satisfies the predefined newsworthiness threshold, continuing with the relating of the newsworthy content to the user-specific search network.

11. The method of claim 1, wherein identifying of the at least one semantic network further comprises:
for each identified potential newsworthy semantic network, comparing the base newsworthiness rating of each semantic unit to the predefined newsworthiness threshold; and
when a difference between the base newsworthiness rating of the semantic unit and the predefined newsworthiness threshold meets a predetermined value, removing the semantic unit from the identified potential newsworthy semantic network, wherein semantic units subordinate to the removed semantic unit are also removed.

12. The method of claim 3, wherein generating of the user-specific search network further comprises:
utilizing a query expansion scheme to expand terminology used to for subject and object nodes of the user-specific search network.

13. A method comprising:
calculating a base newsworthiness rating for each relationship contained in a semantic library, wherein said calculation of the base newsworthiness rating utilizes at least one global newsworthiness parameter and at least one behavioral function that model at least one newsworthy influence between nodes of semantic networks;
generating a user-specific search network containing at least one semantic unit that reflects at least one user-entered criterion or at least one user task-related criterion;
creating a newsworthy content recommendation graph from the user specific search network and the related newsworthy content; and
presenting the newsworthy content recommendation graph within a user interface.

14. The method of claim 13, further comprising:
creating the semantic library from a plurality of data artifacts having textual content by a newsworthy content recommendation engine using a predetermined semantic ontology, wherein the textual content of each data artifact is represented as a semantic network comprised of a plurality of semantic units that express a relationship between a subject node and an object node, wherein separate semantic networks are inter-related at common nodes.

15. The method of claim 13, further comprising:
dynamically determining an existence of newsworthy content in each identified potential newsworthy semantic network with respect to the user-specific search network, wherein newsworthy content is represented by at least one semantic unit from an identified potential newsworthy semantic network having the at least one node in common with the user-specific search network, wherein, when the newsworthy content comprises a plurality of semantic units, said plurality of semantic units are related via a series of common nodes and is traceable to the at least one node in common with the user-specific search network, and, wherein said determination is based upon at least the base newsworthiness rating of the at least one semantic unit and a predefined newsworthiness threshold; and
when newsworthy content exists, relating said newsworthy content from the identified potential newsworthy semantic network to the user-specific search network at the at least one node in common, wherein the creating of the newsworthy content recommendation graph relies upon results of the relating of the newsworthy content to the user-specific search network.

* * * * *